(No Model.)

A. M. SCOTT & J. H. CRICKENBERGER.
TIRE HOLDER.

No. 547,811. Patented Oct. 15, 1895.

Witnesses

Inventors
Albert M. Scott
John H. Crickenberger
By their Attorneys,
C. A. Snow & Co.

UNITED STATES PATENT OFFICE.

ALBERT M. SCOTT AND JOHN H. CRICKENBERGER, OF NOKOMIS, ILLINOIS.

TIRE-HOLDER.

SPECIFICATION forming part of Letters Patent No. 547,811, dated October 15, 1895.

Application filed July 29, 1895. Serial No. 557,505. (No model.)

*To all whom it may concern:*

Be it known that we, ALBERT M. SCOTT and JOHN H. CRICKENBERGER, citizens of the United States, residing at Nokomis, in the county of Montgomery and State of Illinois, have invented a new and useful Tire-Holder, of which the following is a specification.

The invention relates to improvements in tire-holders.

The object of the present invention is to provide a simple and inexpensive device capable of being readily manufactured and adapted to be quickly applied to all kinds of wheels employing a felly and a tire and capable of preventing the tire from leaving the felly.

The invention consists in the construction and novel combination and arrangement of parts hereinafter fully described, illustrated in the accompanying drawings, and pointed out in the claim hereto appended.

Figure 1:
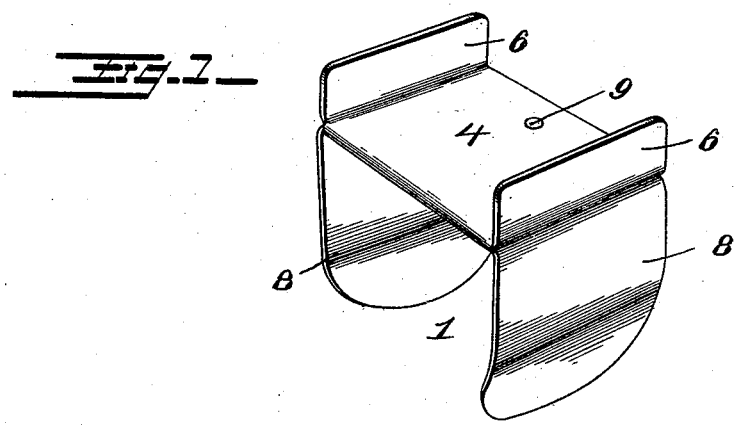
Figure 2:
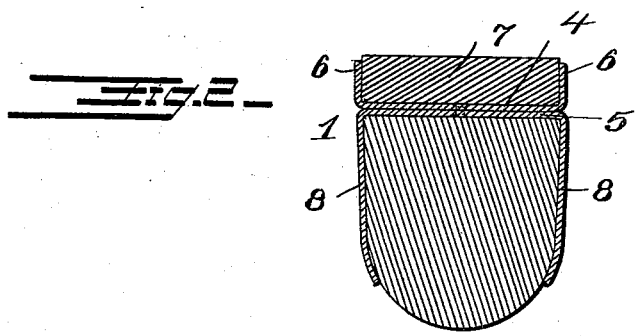
Figure 3:
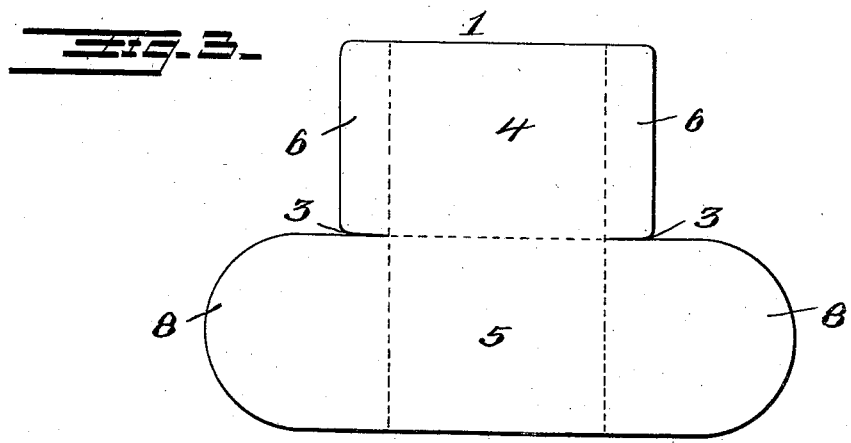

In the drawings, Figure 1 is a perspective view of a tire-holder constructed in accordance with this invention. Fig. 2 is a transverse sectional view of a tire and felly and showing a tire-holder applied thereto. Fig. 3 is a plan view of the blank before folding.

Like numerals of reference indicate corresponding parts in all the figures of the drawings.

1 designates a tire-holder constructed of a single piece of sheet metal, which is substantially T-shaped before folding, as illustrated in Fig. 3 of the accompanying drawings, and which is provided at the angles with short cuts 3. The sheet metal is folded at the cuts 3 to form the upper and lower portions 4 and 5, and the side edges of the upper portion 4 are bent upward to form flanges 6, which embrace the side edges of the tire 7. The bottom portion 5 is bent downward at opposite sides of the felly to form depending sides or flanges 8, which embrace the opposite sides of the felly, and which are curved inward to conform to the configuration of the same.

The free edges of the upper and lower portions 4 and 5 opposite the fold or bend are connected by a rivet 9 or other suitable fastening device; but when the device is applied in position the upper and lower portions 4 and 5 are interposed between the tire and the felly, which relieves the rivet from strain.

The tire-holder is applicable to all classes of wheels—such as vehicle-wheels, wheelbarrow-wheels, cultivator-wheels, and the like—employing a felly and a tire, and it will be readily seen that it is capable of effectually preventing the tire from moving laterally and becoming displaced. It will also be apparent that the device is exceedingly simple in construction, that it may be cheaply manufactured, and that it is capable of being readily stamped or cut out of sheet metal.

Changes in the form, proportion, and the minor details of construction may be resorted to without departing from the principle or sacrificing any of the advantages of this invention.

What we claim is—

A tire holder constructed of a single piece of sheet metal, substantially T-shaped, cut at the angles and folded to form the upper and lower portions 4 and 5, the side edges of the upper portion 4 being bent upward to form side flanges, and the ends of the lower portion being bent downward to form depending portions or flanges for embracing a felly, substantially as described.

In testimony that we claim the foregoing as our own we have hereto affixed our signatures in the presence of two witnesses.

ALBERT M. SCOTT.
JOHN H. CRICKENBERGER.

Witnesses:
ANDREW J. WILLIFORD,
JOSEPH L. MANNING.